UNITED STATES PATENT OFFICE.

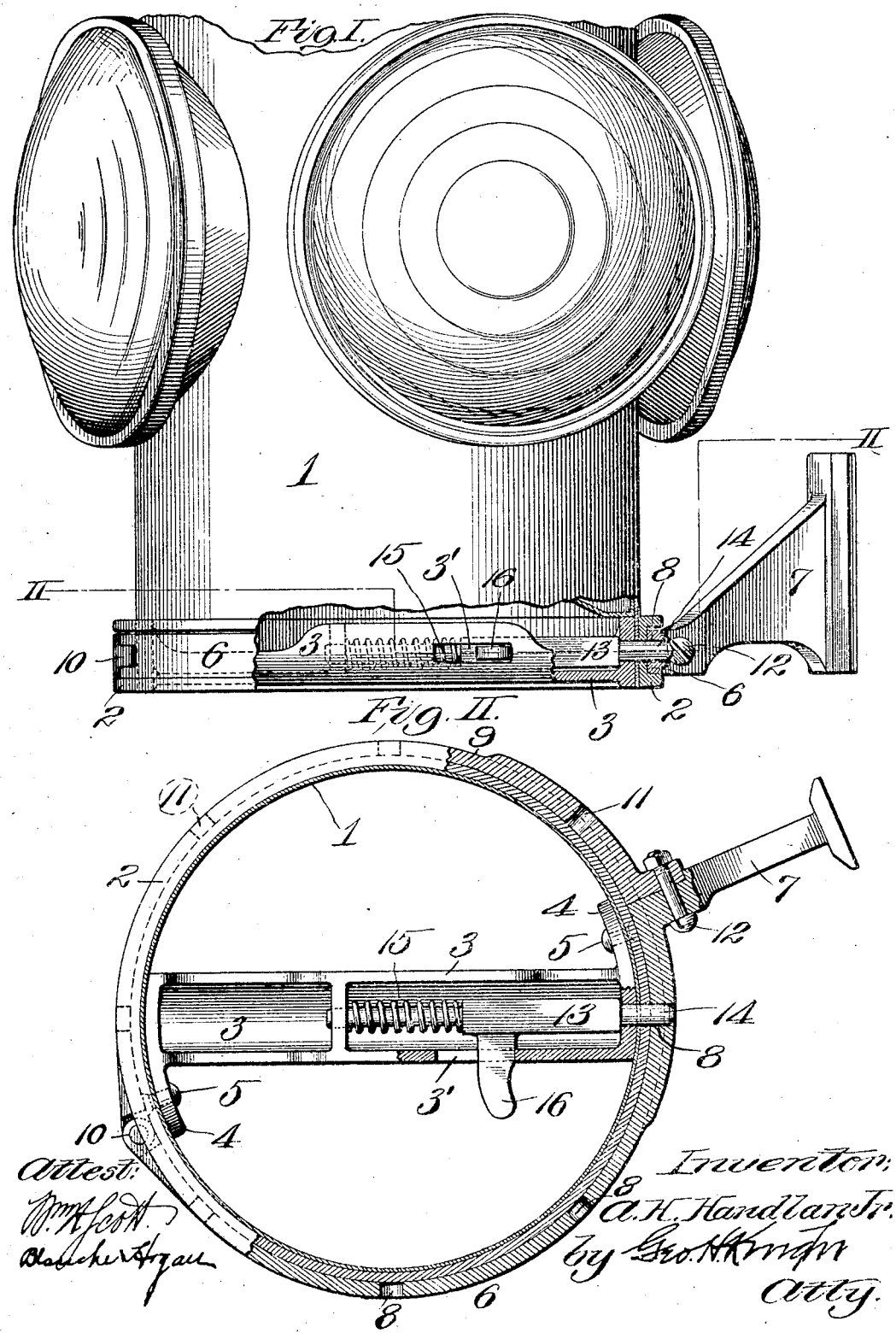

ALEXANDER H. HANDLAN, JR., OF ST. LOUIS, MISSOURI.

COMBINED BASE-RING AND BRACKET FOR SIGNAL-LAMPS.

No. 882,309.　　　Specification of Letters Patent.　　　Patented March 17, 1908.

Application filed January 2, 1908. Serial No. 408,925.

*To all whom it may concern:*

Be it known that I, ALEXANDER H. HANDLAN, Jr., a citizen of the United States of America, residing in the city of St. Louis and State of Missouri, have invented certain new and useful Improvements in Combined Base-Rings and Brackets for Signal-Lamps, of which the following is a full, clear, and exact description, reference being had to the accompanying drawings, forming part of this specification.

My invention relates to signal or other lamps used in railway service, and it has for its object to provide means whereby the bottoms of the shells of such lamps may be efficiently reinforced to afford rigidity therein in both transverse and vertical directions, and further to provide in connection with the reinforcing members of the lamps, a bracket and adjustment means for holding the lamps in set positions, when mounted in the brackets.

Figure I is a view partly in elevation and partly in vertical section of a lamp and my reinforcing members and bracket. Fig. II is a horizontal section taken on line II—II, Fig. I.

In the accompanying drawings: 1 designates the shell of a signal or similar lamp.

2 designates a reinforcing ring preferably of channel shape and which is preferably of considerably heavier material than the shell 1. This reinforcing ring is fitted around the lower portion of the shell 1, and its lower edge is located even with the bottom of said shell, or if desired, may project slightly below the bottom of the shell.

3 is a cross bar that is fitted within the lower portion of the shell of the lamp and which is provided with laterally extending lips 4, which serve to receive rivets 5 or other suitable means of fastening by which the cross bar is secured to the shell of the lamp and the reinforcing ring 2. The construction of the reinforcing ring and cross bar located and connected as described, provide a very efficient reinforcement for the bottom of the lamp and by the employment of these members, all liability of injury to the lamp, when it is in use either mounted in a bracket or when carried by hand and set down suddenly upon a hard substance, is eliminated. The cross bar 3 has a further utility which shall be hereinafter set forth.

6 designates one section of a bracket ring that is fitted to the reinforcing ring 2, and 9 is a second section of said bracket ring that is hinged to the section 6 at 10. The bracket ring section 6 is provided with an arm 7 adapted to be removably mounted in a bracket support and it contains one or more bolt receiving holes 8. The bracket ring section 9 contains one or more bolt receiving holes 11 and it is adapted to be connected to the arm 7 of the section 6 by a bolt 12 or other fastening means. The bracket ring composed of the sections 6 and 7, is loosely fitted to the reinforcing ring 2 for the purpose of permitting rotation of the lamp shell 1 and said reinforcing ring in the bracket ring.

13 is a locking bolt extending longitudinally of and loosely mounted in the cross bar 3 and provided with a point 14 that passes through the lamp shell 1 and the reinforcing ring 2 and is adapted to enter either of the bolt receiving holes 8 or 11 in the bracket ring sections for the purpose of holding the lamp from movement in the bracket ring, after it has been adjusted to any desired degree.

The locking bolt 13 is normally held in a forwardly projected position by a spring 15 and it is provided with a finger arm 16 that projects through a slot 3' in one side of the cross bar 3, so that it may be readily grasped for the purpose of retracting the locking bolt, when it is desired to turn the lamp within the bracket ring. The cross bar 3 serves as a handle which may be readily grasped by the hand of a person engaged in turning the lamp within the bracket ring and the retraction of the locking bolt to permit the turning of the lamp.

I claim:

1. The combination with a lamp of the character described, of a reinforcing ring fitted to the lower portion of the shell of said lamp, and a cross bar within said shell secured to the shell and reinforcing ring, substantially as set forth.

2. The combination with a lamp of the character described, of a reinforcing ring fitted to the lower portion of the shell of said lamp, and a cross bar within said shell having lips secured to the shell of the lamp and the reinforcing ring, substantially as set forth.

3. The combination with a lamp of the character described, of a reinforcing ring fitted to the lower portion of the shell of said lamp, a cross bar within said shell having lips extending laterally at its ends, and rivets or the like extending through said lips, shell and reinforcing ring to connect said parts, substantially as set forth.

4. The combination with a lamp of the character described, of a reinforcing ring fitted to the lower portion of the shell of said lamp, a cross bar within said shell secured to said shell and reinforcing ring, and a bracket ring fitted to said reinforcing ring, substantially as set forth.

5. The combination with a lamp of the character described, of a reinforcing ring fitted to the lower portion of the shell of said lamp, a cross bar within said shell secured to said shell and reinforcing ring, a bracket ring fitted to said reinforcing ring, and a locking bolt mounted in said cross bar and arranged for engagement with said bracket ring, substantially as set forth.

6. The combination with a lamp of the character described, of a reinforcing ring fitted to the lower portion of the shell of said lamp, a cross bar within said shell secured to said shell and reinforcing ring, a bracket ring fitted to said reinforcing ring, and a locking bolt extending longitudinally of said cross bar and through said shell and reinforcing ring and adapted to enter said bracket ring, substantially as set forth.

ALEXANDER H. HANDLAN, JR.

In presence of—
BLANCHE HOGAN,
H. G. COOK.